Feb. 28, 1967   CARL-ERIK GRANQVIST   3,306,115
STABILIZING SYSTEM FOR A GYROSCOPE
Filed Nov. 5, 1962
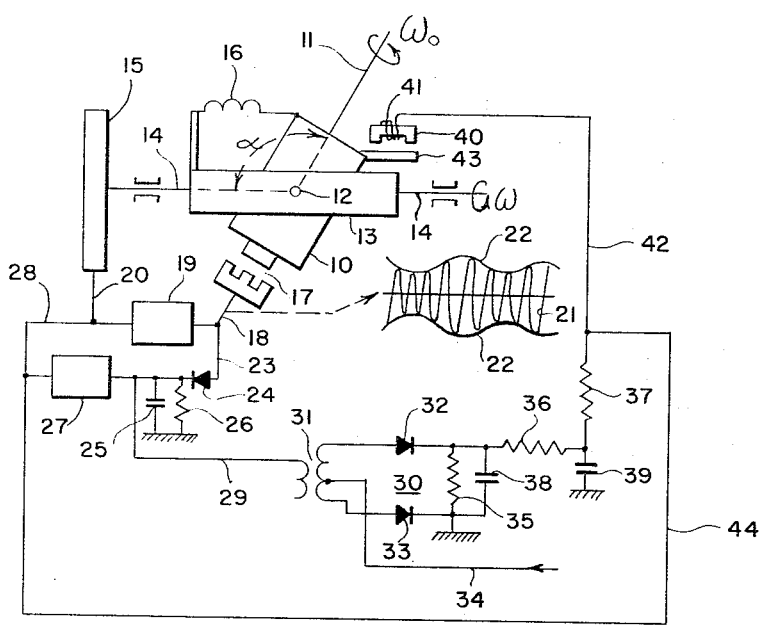
INVENTOR
CARL-ERIK GRANQVIST
BY Larson and Taylor
ATTORNEYS ic or electric forces applies torques to the gimbals which oppose the said nutation.

United States Patent Office 3,306,115
Patented Feb. 28, 1967

3,306,115
STABILIZING SYSTEM FOR A GYROSCOPE
Carl-Erik Granqvist, Lidingo, Sweden, assignor to Aga Aktiebolag, a corporation of Sweden
Filed Nov. 5, 1962, Ser. No. 235,563
Claims priority, application Sweden, Dec. 28, 1961, 13,040/61
5 Claims. (Cl. 74—5)

It has been proposed to use gimbal gyroscopes for inertia navigation, wherein a spring produces a precession torque about the supporting axis of one of the gimbals so that measurement of the angular displacement of the other gimbal will give an indication of the movement in space of the craft in carrying the gyroscope. By carefully compensating for most of the variable factors present in such a system, it is possible to obtain extremely good navigational accuracy. However, it has not been possible to successfully compensate for all occurring factors which could create variations. One such factor is temperature variation of the rotor of the gyroscope and also of the gimbals. To compensate for this temperature factor these parts were made of some metal alloy having an extremely low coefficient of thermal expansion, for instance the alloy which is known as "Invar."

Another variable factor is based upon the properties of the spring, which produces the torque to cause precession. It has been generally assumed, that the force of a spring is proportional to the deflection of said spring, and one has expressed the factor of proportionality as the "spring factor." Investigations which have been made, however, have proved, that the "spring factor" is actually not a constant but varies under different circumstances. In first place the spring factor may vary with variations of temperature. Secondly, the spring factor may vary with time, which is believed to be due to molecular displacements in the spring material during its work, closely related to the phenomenon known as fatigue. But even disregarding these circumstances, the spring factor may vary with stress within intervals of time which are too short to be affected by temperature or fatigue. However, the errors introduced by such a varying spring factor are sufficiently large to impair the accuracy of the navigational system.

Investigations have now shown, that inertia navigation is inherently capable of providing more exact information for fixing positions of rapidly movable craft, such as aeroplanes, than any other known system of navigation. The degree of accuracy possible is so great that one should be able to limit errors to one or a few parts per million, if it were not for the errors introduced because of variations due to temperature, even after one has used Invar for the gyrorotor and has used such materials for the spring, which have been considered to provide an absolutely constant spring factor.

In connection with the rapidly increasing speeds with which objects and craft are moving in space, the demands for accuracy in inertia navigation have successively increased. It is now desirable to obtain an accuracy of such a high degree, that a flying craft moving with supersonic speed one should be able to determine its position relative to the surface of the ground by inertia navigation with an error, which must not exceed one tenth of a nautical mile per hour, which substantially corresponds to the above-mentioned accuracy of one part per million.

This demand for great accuracy is satisfied according to the present invention. Substantially, this invention consists in sensing the motions of nutation which are superimposed upon precession and which are due to variations of the above described kind, converting the same into an electrical signal and feeding said signal to a device hereinafter described as an "electrical spring" which by magnetic or electric forces applies torques to the gimbals which oppose the said nutation.

In detail it is proposed to provide a gyroscope used for inertial navigation, comprising a spring connecting the two gimbals of the gyro suspension for generating a torque between them and creating precession movement of one of said gimbals inclusive of the other one and the gyro-rotor, sensing means associated with the gimbals for generation of a signal dependent upon movement between the two gimbals and for controlling a torque motor for applying corrective torque to the gimbal which rotates by precession movement, a circuit for separating the signal due to nutation from the signal representing precession, means for comparing the frequency of the signal due to nutation with a reference frequency and for feeding the difference voltage to an electrical spring which applies a torque to the precessing gimbal ring in a direction which will just correct the effect of the variation in the relationship between the spring rate of the precession-creating spring and the moment of inertia of the gyroscope rotor, which is responsible for the nutation.

The electrical spring is understood to be a device whereby a correcting torque can be applied to the gyro suspension or the precessing gimbal by the effect of an electric or magnetic field in such manner that no friction arises and that hysteresis and remanence effects are too small to have measurable consequences.

Below the invention will be further described in connection with the attached drawing, which is a schematic diagram of one form of the invention.

A gyroscope for inertia navigation with a torque motor for creating the precession movements is composed of the following parts:

The gyrorotor, which is not visible in the drawing, rotates in the interior of the inner gimbal 10 around the shaft 11. The inner gimbal 10 in its turn is rotatably mounted about a shaft 12 in the outer gimbal 13, which is rotatable about a shaft 14. On the shaft 14 the torque motor 15 is provided and between the inner gimbal 10 and the outer gimbal 13 a spring 16 is provided in such a way, as to create a precession force or torque between the inner gimbal 10 and the outer gimbal 13 so that the inner gimbal should be in standstill relative to the outer gimbal, but all of the gimbal construction should rotate with a slow but constant speed about the axis of shaft 14. For observing this precession movement a sensing device 17 is provided, preferably but not necessarily in the form of a yoke on one of the gimbals, and an E-magnet core is fed with alternating current, and a couple of secondary windings, which may for instance be applied on the side legs of said E-magnet core deliver their anti-phase voltages over an electrical conduit 18 to an amplifier 19. This amplifier 19 feeds the torque motor 15 over the electrical conduit 20.

So far the arrangement is already known. Its functioning may be briefly described in the following way. The gyro-rotor tends to stand still in relation to the universe. When the craft carrying the gyroscope is moving over the surface of the earth, a displacement will take place between the inner and the outer gimbal. However, friction between the shaft 14 and its bearings and similar disturbing circumstances may cause a precession torque to be applied from the outer gimbal to the inner gimbal, a so-called secondary precession, and this may put the inner gimbal into a precession movement, which is superimposed on the movement of the inner gimbal, which should be observed for navigational purposes. This movement produces an unbalanced state in the sensing device 17, the output voltage of which indicates the magnitude of the unbalance and by its phase the direction of said unbalance. This voltage is amplified in the amplifier 19 and fed back to the torque motor 15, which tends to rotate the outer gimbal to restore the balance. The torque thus impressed on the outer gimbal will cause the inner gimbal to precess against the action of the spring 16. This spring force resets the sensing device 17 in a direction to the state of balance, until the entire system has attained a stable, balanced state, in which it can give a good and reliable reading for the position of the craft at that instant.

This stable state is defined by the following equation:

$$\omega \cdot \omega_0 \cdot I_p \cdot \sin \alpha = F \cdot \alpha \qquad (1)$$

In this equation $\omega$ is the rotation speed in radians per second of the outer gimbal shaft 14, $\omega_0$ is the rotational speed in the same units of the shaft 11 of the gyro rotor, $I_p$ is the polar inertia moment of the gyro rotor, F is the spring factor (which is thus assumed in accordance with the real circumstances not to be constant) and finally $\alpha$ is the angle between the shafts 11 of the gyro rotor and 14 of the outer gimbal.

Due to such errors as mentioned above, for instance variations in the constancy of the spring factor, in the temperature and dimensions of the gyro rotor and so on, however, errors will be introduced into the Equation 1 according to above. These errors cause a secondary disturbance movement, superimposed on the desired movement according to Equation 1, said secondary disturbance movement, due to existing masses and resetting forces having the character of a non-damped sinusoidal oscillation with the frequency $\omega_n$, and called nutation. Its frequency is determined by the equatorial inertia moment of the gyro rotor together with its rotor casing $I_x$ and the spring factor F according to the following equation:

$$I_x \cdot \omega_n^2 = F \qquad (2)$$

Inserting the spring factor F in Equation 1, the equation becomes according to the following:

$$\omega \cdot \omega_0 \cdot I_p \cdot \sin \alpha = I_x \cdot \omega_n^2 \cdot \alpha \qquad (3)$$

This equation can also be rewritten as follows:

$$\omega \cdot \omega_0 \frac{I_p}{I_x} \sin \alpha = \omega_n^2 \cdot \alpha \qquad (4)$$

It is seen from the last-mentioned equation that the spring factor no longer occurs, but that instead the nutation frequency $\omega_n$ which can be observed from the outside has been introduced into the equation. Secondly, the one inertia moment or the other one do not occur separately, but that the two inertia moments occur in the form of a ratio.

It is understood from this that one can measure the nutation frequency and its compensation will compensate variations in the spring factor. Thereafter it can be regarded, as if it was really a constant, as is also usually assumed in calculations with less demands for accuracy than the above-mentioned one. It is also seen, that if temperature variations should occur which could influence one of the moments of inertia, for instance the inertia moment $I_p$, then one may assume that the corresponding temperature variations will also occur in the parts which contribute to the moment of inertia $I_x$, especially since the same mechanical parts are generally responsible for both moments of inertia, but the moments are measured in relation to different inertia axes. It would therefore be possible, by compensation of the nutation oscillation to provide a practically complete compensation for temperature variations in the different masses, as well as in existing variations in the spring factor.

In order that it should be possible to separate the nutation oscillations from the oscillations fed from outside to the sensing device for compensational purposes, the latter ones should be of a frequency of an order of magnitude, which differs essentially from the order of magnitude of the nutation oscillation frequency. The latter one is dependent mainly on mechanical factors and therefore can be assumed to be rather low, and it is then convenient to use a rather high frequency for the voltage, which is fed to the middle leg of the E-magnet in the sensing device.

The signal occurring in the line 18, thus represents two different oscillations, namely, the high frequency oscillation, occurring as output from the sensing device 17, and also an oscillation of essentially lower frequency superimposed thereon, which represents the nutation oscillation. The two oscillations have been indicated in a diagram at the side of the conductor 18. The high frequency control voltage is indicated by 21, and the nutation modulates the high frequency oscillation by the envelope wave as indicated as 22.

As earlier described, the high frequency oscillation is conducted through the amplifier 19 to the torque motor 15. The nutation oscillation, however, is tapped off through a line 23 and is rectified in a rectifier 24 to be made useful for compensation purposes. The compensation takes place in two different circuits, cooperating mutually to some degree.

In the first place the nutation oscillation 22 is conducted through a grounding filter, consisting of the capacitor 25 and the resistor 26, to an amplifier 27. The output side of said amplifier is connected to the torque motor for applying a torque to the shaft 14 in a direction counteracting the nutation oscillation. As there is already a torque motor 15 present, it is of course, suitable to use this motor not only for its initial purpose but also for compensating the nutation oscillation. The amplifier 27, therefore, is connected with its output side to the line 20 over a line 28.

A second conduit 29 is connected at some point in the line 23–27 for transferring the nutation oscillation to a frequency detector 30, the input transformer of which is indicated as 31. This frequency detector 30, in the usual way is provided with two rectifiers 32, 33. As the frequency variations occurring are extremely small, the detector 30 can also be regarded as a phase detector. For facilitating detection a reference frequency is fed from a suitably crystal controlled generator over the conductor 34. By means of suitable filter arrangements, for instance consisting of the resistors 35, 36, 37 and the capacitors 38 and 39, the rectified signal from the phase detector 30 is transferred to a device, functioning as an electrical spring. In its simplest form this may consist of a magnet 40 attached to the gimbal 13 and having a very soft iron core free of remanence, around which a winding 41 has been applied, said winding being connected by the conductor 42 with the phase detector 30. An armature 43, which is attached to the gimbal 10 cooperates with the magnet 40.

It is now evident, that if the phase position is correctly chosen, a wave will be created in the nutation voltage by a deviation in the spring factor producing clockwise nutation of the inner gimbal. This wave is picked up by the sensing device 17 and fed to the phase detector 30 in such a manner that the magnet 40 will counteract the undesired movement of the inner gimbal, which caused said oscillation. One may compare the magnet 40 and its armature 43 with a spring, continuously counteracting the spring 16 to suppress undesired movements. Therefore it is proposed to refer to this device as an "electrical spring." Of course, this electrical spring must not necessarily consist of a magnet with an armature but one may use other kinds of means which can apply a non-frictional non-remanent force to the gimbal, for instance capacitive means and so on.

When using an electrical spring of the above-mentioned kind, one may, however, not fully achieve a complete absence of remanence. A soft iron which has no magnetic retentivity does not exist, and for that reason remanence will always occur in the magnet 40 and in its armature 43. It is further known, that a given molecular remanence occurs in practically all rectifiers. The rectifiers 30 and 33 will not be completely free from such effects, and this remanence also can not be fully disregarded. It should be kept in mind, as a matter of fact, that the accuracy existing in usual control apparatus is so low, as compared with the accuracy provided by a device according to the present invention that remanence effects could be properly disregarded, but in the arrangement according to the present invention they must be taken into account in the same way as variations in the spring factor.

As means are not known, by which one can decrease such remanence effects, steps must be taken to ensure that their magnitude is small in relation to the compensating forces. One will therefore try to have the resetting force generated by the electrical spring 40–41 as large as possible, but one must then also compensate for this greater resetting force by a corresponding counteracting force from the torque motor 15. For this purpose one can connect the conductor 42 to the electrical spring 40–41 as well as with the torque motor 15, so that a resetting force will be transferred over the conductor 44 to the torque motor 15. This feed-back will then accentuate the restoring effect controlled by the sensing device 17–18 without the real indication being increased. In other words, the sensitivity of the sensing device will appear to be increased, simultaneously as the voltage in the conductor 42 is increased to a corresponding degree. This causes an increase of the resetting force of the electrical spring 40–41 without the forces, caused by a disturbing remanence being increased. The accuracy will therefore be increased in proportion to the relation between the resetting force and the disturbing force.

What I claim is:

1. In a system for stabilizing a gyroscope particularly used in inertial navigation and having two gimbals suspending a gyroscope rotor therein, the combination of a spring interconnecting the two gimbals to produce a torque therebetween thereby counteracting precession movement of one of the gimbals, sensing means for indicating relative displacement between the gimbals and for generating a signal indicative of said displacement, a torque motor responsive to said signal and connected to apply a corrective torque to the other gimbal whereby a precession movement is produced on said one gimbal, circuit means for separating the signal due to nutation from the signal representing precession, means for comparing electrically the frequency of the signal due to nutation and a reference frequency and for producing a difference signal, and an electrical spring responsive to said difference signal and connected to apply a torque to said one gimbal in a direction to compensate for variation in the relation between the spring factor of said spring and the moment of inertia of the gyroscope rotor which produces said nutation.

2. In a system as claimed in claim 1 and comprising an electrical circuit interconnecting said sensing means and said torque motor to feed a rectified voltage signal from said sensing means to said torque motor, and a second circuit parallel to said first-mentioned circuit including rectifier means to feed to said torque motor a voltage obtained by rectification of the voltage representing the nutation of the gyroscope rotor.

3. In a system as claimed in claim 2 and further comprising a third circuit tapped from said second circuit and including phase detector means for receiving the rectified voltage representing the gyroscope rotor nutation and generating an output signal, said electrical spring being connected to said phase detector means to receive the output signal therefrom.

4. In a system as claimed in claim 3 and further comprising circuit means interconnecting the output of said phase detector means and the input of said torque motor for feeding back the phase detector output signal to the input of said torque motor.

5. In a system as claimed in claim 1 wherein said electrical spring comprises an armature mounted on one gimbal, and an electromagnet mounted on the other gimbal in operative relationship to said armature.

References Cited by the Examiner

UNITED STATES PATENTS 2,718,788   9/1955   Johnson _____ 74—5.5

FOREIGN PATENTS 630,657   10/1947   Great Britain.

FRED C. MATTERN, Jr., *Primary Examiner.*

DON A. WAITE, *Examiner.*

K. J. DOOD, P. W. SULLIVAN, *Assistant Examiners.*